United States Patent Office 3,397,477
Patented Aug. 20, 1968

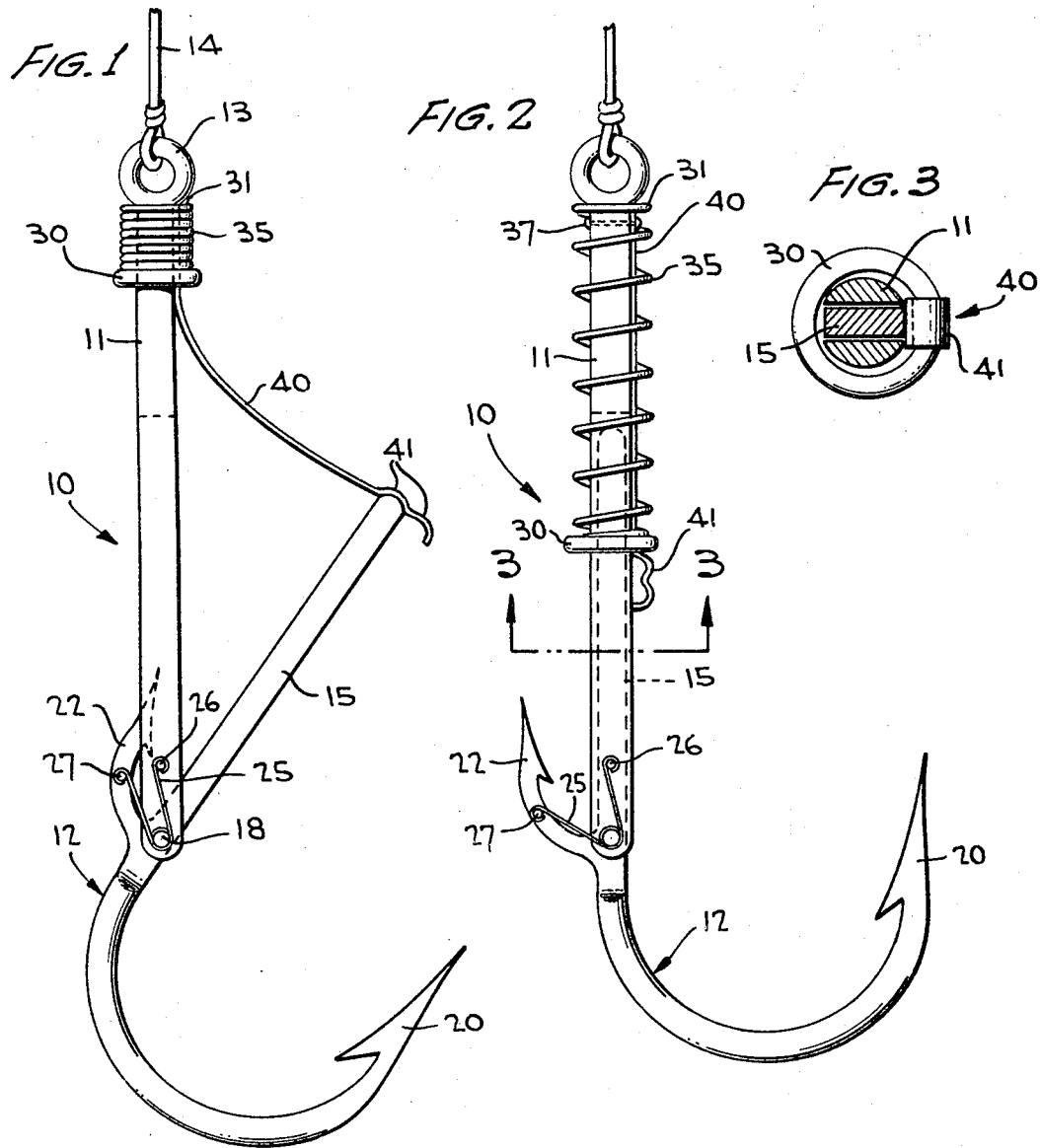

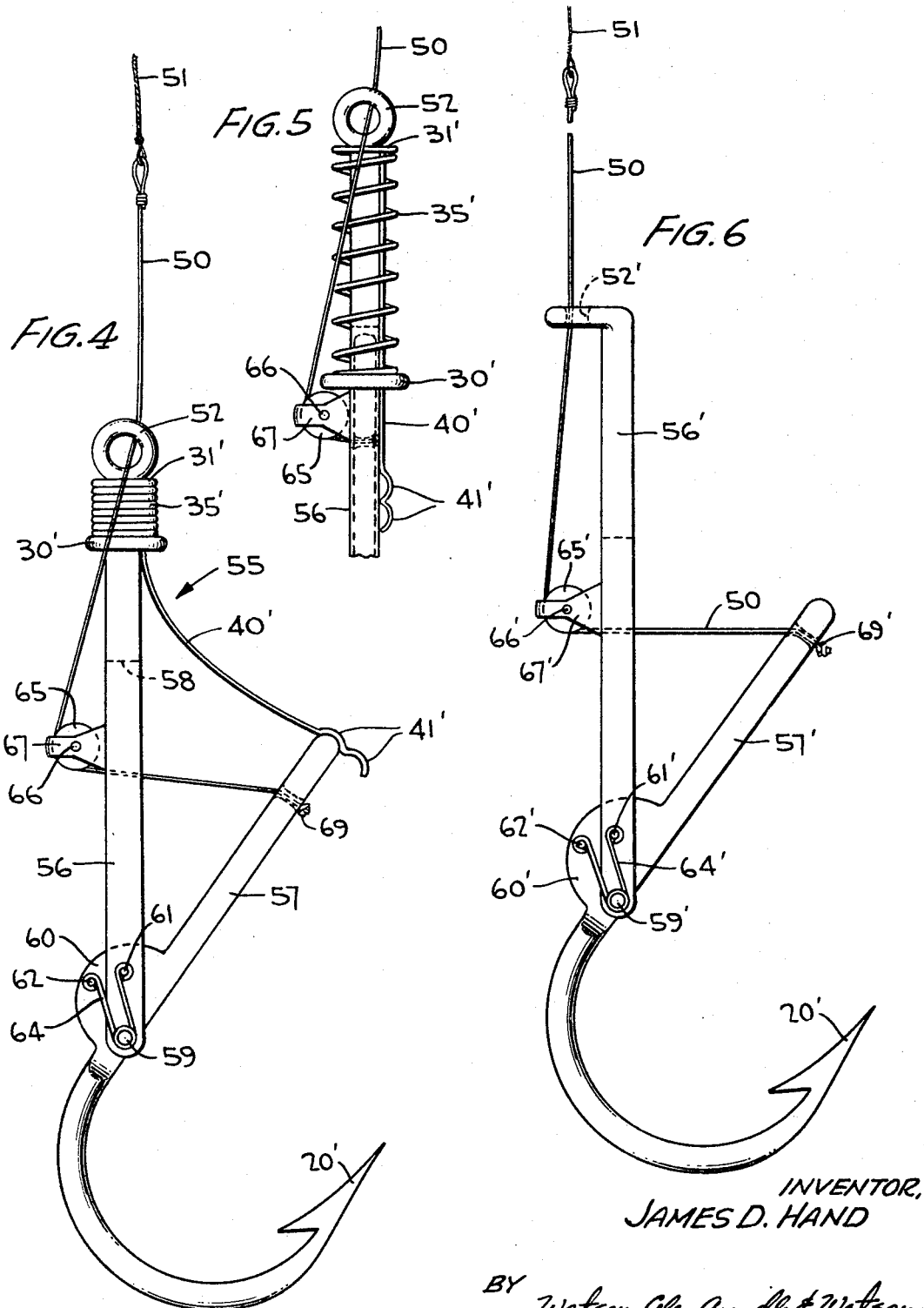

3,397,477
FISHHOOKS
James D. Hand, 137 Hudson St.,
Crestview, Fla. 32536
Continuation-in-part of application Ser. No. 488,658,
Sept. 20, 1965. This application July 12, 1966, Ser.
No. 565,360
12 Claims. (Cl. 43—15)

ABSTRACT OF THE DISCLOSURE

A fishhook is pivotally connected to the bifurcated portion of a line connected stem element substantially at the juncture of the shank and bight portions of the fishhook and is swingable between a cocked position, in which the shank is releasably held at an angle to the stem element and a fish snagging position, in which the shank is received in the space between the bifurcations. In separate embodiments, a spring and/or line is utilized to propel the fishhook from cocked to snagging position. In the spring propelled embodiments, a coiled latch spring surrounds the stem element and the fishhook shank in the snagging position and a spring trigger arm releasably engages the free end of the fishhook shank and the latch spring in the cocked position.

---

This application is a continuation-in-part of my prior, now abandoned application Ser. No. 488,658, filed Sept. 20, 1965.

This invention relates to fishing apparatus and more particularly to multiple-part, spring-controlled grab hooks.

The general object of the invention is the provision of a novel and improved fishhook assembly useful in salt or fresh water for either commercial or sport fishing.

The invention, in its preferred embodiments, contemplates the provision of a fishhook device comprising two articulated principal parts, a relatively straight shank and the hook proper which is pivoted to the shank so that the barb may be swung sharply to snag the fish securely once a nibble is had. Means are provided tending to retain the hook portion in displaced or cocked position, and further means are provided to strongly urge or snap the hook portion forwardly to snag the fish, and to approach a position wherein the proximal end of the hook portion is substantially aligned with the shank portion to which it is pivoted.

In one embodiment of the invention, the hook is spring biased toward the upward or forward final position and is retained in the downwardly angled more open cocked position by a trigger device which is adapted to be readily tripped by the action of the fish in seizing the baited hook.

In an alternative embodiment, the hook portion is rather weakly biased toward cocked position by spring means, and the force for urging or snapping the hook to forward snagging position is applied by the pull on the line by the fisherman through novel means associated with both portions of the hook device.

Another novel feature is the provision of means for retaining the hook proper in substantially rigid and secure alignment with the shank after the fish has been caught, this retaining means preferably being tripped by the same trigger means that snaps the hook portion from its preliminary to its eventual position.

An auxiliary feature which cooperates neatly with those above mentioned is the provision of a supplemental barb on the back portion of the hook adjacent the pivoted connection with the shank, this to give added assurance to retention of the catch.

Other objects and features of novelty will be apparent from the following specification when read in connection with the accompanying drawings in which certain embodiments of the invention are illustrated by way of example.

In the drawings:

FIGURE 1 is a view in side elevation of a fishhook assembly embodying the principles of the invention, the parts being in baited and cocked position;

FIGURE 2 is a similar view of the device in its sprung or tripped position;

FIGURE 3 is a view in horizontal cross section taken on line 3—3 of FIGURE 2;

FIGURE 4 is a view similar to FIGURE 1 showing a variant form of the invention in cocked position;

FIGURE 5 is a fragmentary view in elevation of the upper portion of the device of FIGURE 4 but in snagging position; and FIGURE 6 is a view similar to FIGURE 4 of still another embodiment of the invention.

The hook assembly in the embodiment illustrated in FIGURES 1, 2 and 3, is designated generally by the reference numeral 10 and comprises a shank member 11 and the hook member 12, the shank terminating at its upward end in the eye 13 to which may be secured the usual snell or leader 14. As clearly indicated in FIGURE 3 of the drawings, the shank portion 11 is bifurcated to receive the stem 15 of the hook member 12, the parts being pivotally connected together by the pivot pin 18.

The hook member 12 is of the usual substantially J-shape and the hook proper is provided with the barb 20. In this embodiment the stem portion 15 is flattened somewhat from the generally cylindrical curved portion of the hook so as to fit more snugly within the bifurcation in the shank portion 11.

Immediately adjacent the pivot point 18 there is preferably provided a supplemental barb 22 which not only provides auxiliary means for securing the fish but also affords an extra short arm or projection for the anchoring of the sear spring 25, the ends of the arms of the spring being respectively secured to the pin 26 on the shank and the pin 27 on the barb, and a central loop in the spring surrounding the pivot pin 18. The pins can also serve an additional function of a stop means which will prevent the hook from swinging too far in the open or inclined direction. The supplemental barb 22, of course, is arranged so that it may enter at least partially into the bifurcation of the shank portion 11 wihch has been vacated by the stem 15 when the hook is in cocked position.

A securing ring 30 surrounds the shank 11 and between the ring 30 and an abutment 31 at the upper end of the shank 11 there is disposed a coil compression spring 35. Secured as by means of the pin or rivet 37 at the upper end of the shank 11 is a flat retaining spring member 40. This member 40 is arranged to normally lie within the confines of the securing ring 30 and the coil spring 35, and in the normal relaxed position of the device it will lie alongside the shank portion 11 within the ring and the spring. The outer end of the leaf spring 40 is provided with one or more corrugations 41 which provide shallow socket portions for the extremity of the stem 15 of the hook portion 12 when the device is in cocked position.

In operation, the main barb 20 of the hook portion 12 is baited appropriately and then the hook portion 12 is swung from the position shown in FIGURE 2 to the cocked position of FIGURE 1, the securing ring 30 having been slid upwardly on the shank 11 compressing the spring 35 and thus freeing the spring blade 40 so that it may be stressed outwardly and one of the shallow contact points 41 applied to the extremity of the stem 15. This of course is against the urging of the sear spring 25, this spring having been put under stress when the parts are moved to the position shown in FIGURE 1.

The contacting parts of the spring end portions 41 and the tip of the stem 15 may be shaped to either give a hard trigger action or a hair trigger action depending upon the kind of fishing intended.

Now with the hook baited and the parts moved to the position shown in FIGURE 1, the assembly is ready for fishing. When the fish seizes the baited hook 20 this will detach the retainer connection between the spring 40 and the stem 15, and the spring 25 will cause the hook 20 to swing suddenly around the pivot 18 in an upward and forward direction and firmly secure the fish, aided of course by the supplemental barb 22 if the latter is employed.

At the same time the collapsing of the retainer spring 40 to its normal position alongside the shank portion 11 permits the securing ring 30 to shoot downwardly under the influence of the coil spring 35 and surround the upper portion of the stem portion 15 which is now sheathed within the bifurcation of the shank 11. This converts the hook assembly into a rigid solid unitary whole and there is no danger of displacement of the hook portion and consequent loss of the catch.

The bent retainer portions 41 at the end of the spring 40 also serve the purpose of limiting the downward movement of the ring 30 as clearly shown in FIGURE 2 of the drawings.

In the embodiment illustrated in FIGURES 4 and 5, the leader or snell 50 attached to the end of the line 51 passes loosely through the eye 52 of the variant hook assembly which is designated generally by the reference character 55. As in the previously described embodiment, the hook 55 includes a shank portion 56 and the hook portion 57. The shank 56 is split as in the other embodiment beginning at the line 58, for the reception of the upper or proximal portion of the hook element 57.

As in the other embodiment, the hook portion 57 is pivoted to the lower end of the shank 56 by means of the pin 59 and, adjacent this point, the hook portion may be provided with a substantially semi-circular disc-like protuberance 60 which may be used in substitution for the supplemental barb 22 of the previous embodiment, although if desired, the barb may be included in this embodiment; and of course if the back barb is not considered necessary for the type of fishing in prospect, the embodiment shown in FIGURES 1 and 2 may be provided with a disc-like configuration as at 60 in FIGURE 4. A pin 61 extends from the lower portion of the shank 56 and another pin 62 projects from part of the disc 60 and the V-shaped spring element 64 is secured to the pins 59, 61 and 62 as shown in the drawings, with the spring tensioned toward separation of the arms thereof so as to urge the upper end of the hook portion 57 toward snagging position in substantial alignment with the shank 56.

The trigger feature in this case is the same as in the previously described embodiment, the parts functioning in the same manner as in that case, and these parts will be designated by the same reference characters with the addition of a prime. Thus the spring trigger itself is shown at 40′, the indented end portions at 41′, the locking ring at 30′, its actuating spring at 35′, and the confining disc at 31′.

However, in this particular embodiment, which is designed to be employed in connection with particularly game fish, additional snagging means supplementing the trigger-and-spring arrangement, is provided. The snell or leader 50 passing through the eye 52 of the shank portion of the hook, passes around a small pulley 65 which is pivoted as at 66 within the shrouded bracket 67 carried by the cleft or bifurcated portion of the shank, and then through the cleft portion to be attached near the upper end of the hook member as at 69. Thus it will be seen that in an exceptionally violent struggle with a fish, wherein the fish might overcome the force of the spring 64 and interfere with its proper functioning, a jerk on the line by the fisherman would successfully complete the catch.

In FIGURE 5 the closed or snagged position of the arrangement is clearly shown.

In FIGURE 6 of the drawings there is shown a still further modified form of the invention in which the snagging effect is accomplished by the tug on the line by the fisherman without the assistance of spring means. In this case the leader or snell 50 extending from the line 51 passes through the eye 52′, which may be turned at an angle of 90° and thence around the pulley 65′ which is mounted by means of the axle 66′ in the hooded or shrouded bracket 67′. The snell 50 then passes between the parts of the bifurcated shank 56′ and is secured to the upper end of the hook member 57′, as at 69′.

The hook portion is quite similar to the one shown in FIGURE 4, having a semi-circular disc-like rearward protrusion indicated at 60′. The V-shaped spring 64′ is secured in a fashion similar to the previously described embodiment, to the respective pins 61′, 62′ and 59′. However, in this instance, the spring 64′ is biased in the opposite direction, that is, toward closing movement which would tend to hold the hook portion 57′ in the cocked position shown in FIGURE 6.

In the operation of this embodiment, the fisherman would detect the presence of a fish through the line and would immediately jerk on the fishing line 51 and thus pull the upper end of the hook member 57′ rearwardly and snap the point 20′ of the hook forwardly and upwardly to secure the catch.

The various parts of the hook assembly may be constructed of the same type of materials as used in the ordinary fishhook, but the springs should be made of or coated with some suitable sort of rust-resistant material.

The present invention provides very simple but effective means for insuring a successful catch once the hook has been seized by the fish and the arrangements in their comparatively simple forms are more compact and equally effective if not more so, as compared with devices which have been designed for accomplishing similar purposes but which include complicated and expensive assemblies involving elongated cylinders, floats, lures, and other devices, and which for the most part involve longitudinal travel of the hook for some distance in securing the fish.

Having thus described the invention, what is claimed as new and desired to be secured by Letters Patent is:

1. A fishhook assembly comprising two articulated principal parts, namely, a shank member adapted in use to extend in a generally upward direction and a single hook member of the usual substantially J-shape having at one end a barbed hook portion; a pivoting element pivotally connecting an intermediate portion of said hook member to the lower end portion of said shank member; the free end of the hook member remote from the hook portion extending above the pivot point and movable between a fish snagging position in close proximity with said shank member and a retracted cocked position angularly related to said shank member above the pivot point; means tending to retain said hook member in said cocked position; and means to propel said hook member toward the snagging position when the fish bites.

2. The fishhook assembly as set forth in claim 1 in which said propelling means comprises a spring device, and said retention means comprises a yieldable retainer element.

3. The fishhook assembly as set forth in claim 2 in which supplemental propelling means are provided for insuring the projection of the hook member toward snagging position, which supplemental means comprises a portion of the fishing line which passes loosely through a part of said shank member and is secured to said free end portion of said hook member, whereby a tug on the line when a bite is detected serves to reinforce the urging of the hook member from cocked position to snagging position.

4. The fishhook assembly as set forth in claim 1 in which said retention means comprises a spring device, and said propelling means comprises a portion of the fishing line which passes loosely through a part of said shank member and is secured to said free end portion of said hook member, whereby a tug on the line when a bite is detected serves to displace the hook member from cocked position to snagging position against the force of the retention spring device.

5. The fishhook assembly as set forth in claim 4 in which an eye is provided at the upper end of said shank member and a pulley is carried by the intermediate portion of said shank member, the line passing through said eye, around said pulley, and thence at an angle to the point of attachment to the free end of the hook member.

6. The fishhook assembly as set forth in claim 1 in which said shank member is bifurcated for a portion of its length to receive the free end of the hook member when the device is sprung.

7. The fishhook assembly as set forth in claim 1 in which there are provided means securing said hook member and said shank member in said fish snagging position once the hook is sprung.

8. The fishhook assembly as set forth in claim 7 in which spring means are provided for urging said securing means toward operative position; said retainer means comprising a spring strip extending from said shank member and having a distal portion adapted to contact and hold the free end of said hook member, and a proximal portion adapted to hold said securing means when said spring strip is strained toward retaining or cocked position.

9. The fishhook assembly as set forth in claim 8 in which the free end of said hook member is shorter than said shank member, said spring strip retaining means is secured to an upward part of said shank member and normally in relaxed position lies alongside of said shank member; said securing means comprises a ring surrounding said shank member and adapted when released to move downwardly to surround both the free end of said hook member and the shank member; and a coil spring surrounds said shank member and is compressed between an upper end of said shank member and said securing ring to urge the latter downwardly, said ring also surrounding said spring strip retainer element, the mesial portion of said retainer element standing away from said shank member when its end is disposed in contact with the free end of said stem, whereby the securing ring is held in upward cocked position until the hook is sprung upon seizure by a fish.

10. The fishhook assembly as set forth in claim 9 in which said shank member is bifurcated for a portion of its length to receive the free end of the hook member when the device is sprung.

11. The fishhook assembly as set forth in claim 9 in which the end of said retainer spring strip is somewhat enlarged to serve as a stop means limiting the downward movement of said ring.

12. The fishhook assembly as set forth in claim 1 in which a supplemental barb extends from the hook member adjacent said pivot point and is adapted to lie alongside said shank member when the parts are in cocked position and to swing outwardly and extend in a direction substantially opposite to the position of the main barb when the device is sprung.

References Cited
UNITED STATES PATENTS

| | | | |
|---|---|---|---|
| 740,775 | 10/1903 | Pardon | 43—34 |
| 1,293,127 | 2/1919 | Lantz | 43—37 |
| 2,087,955 | 7/1937 | Middlemiss | 43—37 |
| 2,643,479 | 6/1953 | Stevenson | 43—36 |

WARNER H. CAMP, *Primary Examiner.*